United States Patent
Meserve

(10) Patent No.: US 7,861,193 B2
(45) Date of Patent: Dec. 28, 2010

(54) REUSE OF CIRCUIT LABELS FOR VERIFICATION OF CIRCUIT RECOGNITION

(75) Inventor: Douglas C. Meserve, San Jose, CA (US)

(73) Assignee: Oracle America, Inc., Redwood City, CA (US)

(*) Notice: Subject to any disclaimer, the term of this patent is extended or adjusted under 35 U.S.C. 154(b) by 365 days.

(21) Appl. No.: 12/035,405

(22) Filed: Feb. 21, 2008

(65) Prior Publication Data

US 2009/0217213 A1    Aug. 27, 2009

(51) Int. Cl.
    *G06F 17/50* (2006.01)
(52) U.S. Cl. ............... 716/1; 716/2; 716/4; 716/5; 716/8; 716/10; 716/11; 716/12; 716/14
(58) Field of Classification Search .............. 716/1, 716/2, 4, 5, 10, 11, 14
    See application file for complete search history.

(56) References Cited

U.S. PATENT DOCUMENTS

| | | | | |
|---|---|---|---|---|
| 6,272,668 | B1* | 8/2001 | Teene | 716/10 |
| 7,013,028 | B2* | 3/2006 | Gont et al. | 382/113 |
| 7,503,021 | B2* | 3/2009 | Boucher et al. | 716/4 |
| 7,650,579 | B2* | 1/2010 | Abadir et al. | 716/5 |
| 2008/0092099 | A1* | 4/2008 | Lin et al. | 716/8 |
| 2008/0282212 | A1* | 11/2008 | Dennison et al. | 716/10 |
| 2009/0119623 | A1* | 5/2009 | Sourjko et al. | 716/4 |
| 2009/0217214 | A1* | 8/2009 | Meserve | 716/1 |
| 2010/0042964 | A1* | 2/2010 | Meserve | 716/12 |

FOREIGN PATENT DOCUMENTS

CA    2609691 A1 *   5/2009

OTHER PUBLICATIONS

White et al.; "Efficient algorithms for subcircuit enumeration and classification for the module identification problem"; Publication Year: 2001; Computer Design, 2001. ICCD 2001. Proceedings. 2001 International Conference on; pp. 519-522.*

Zhang et al.; "Speeding up VLSI Layout Verification Using Fuzzy Attributed Graphs Approach"; Publication Year: 2006; Fuzzy Systems, IEEE Transactions on; vol. 14, Issue: 6; pp. 728-737.*

(Continued)

*Primary Examiner*—Helen Rossoshek
(74) *Attorney, Agent, or Firm*—Martine Penilla & Gencarella, LLP

(57) ABSTRACT

A method for identifying instances of a smaller circuit in a larger circuit is provided. Both the smaller circuit and the larger circuit have a plurality of vertices. A vertex is one of a device or a net. The device, such a transistor, includes a Gate, a Drain, and a Source. The net is a wired connection between devices. The method includes recursively relabeling of each of the plurality of vertices until labels of all neighboring vertices of a selected vertex are zero. The neighboring vertices of a vertex are vertices that are directly connected to the vertex. Each successive iteration of the relabeling uses labels of each of the plurality of vertices after a previous iteration of the relabeling. Then, a recursive circuit tracing operation is performed.

16 Claims, 12 Drawing Sheets

OTHER PUBLICATIONS

Nikolay Rubanov; Subislands: The Probabilistic Matech Assignment Algorithm for Subcircuit Recognition; Jan. 1, 2003; IEEE Transactions on Computer-Aided Design of Integrated Circuits and Systems.

Ohluich et al.; Subgemini: Identifying Subcircuits Using a Fast Subgraph Isomorphism Algorithm; 1993; 30th ACM/IEE Design Automation Conference.

* cited by examiner

REUSE OF CIRCUIT LABELS FOR VERIFICATION OF CIRCUIT RECOGNITION

CROSS REFERENCE TO RELATED APPLICATIONS

This Application is related to co-pending U.S. patent application Ser. No. 12/035,409, filed on Feb. 21, 2008, entitled "Unidirectional Relabeling for SubCircuit Recognition," which is incorporated herein by reference for all purposes.

FIELD OF INVENTION

The present invention generally relates to electronic circuit design. More particularly, the present invention is directed to efficiently and accurately finding predetermined patterns in a main circuit design.

BACKGROUND

The present invention generally relates to electronic circuit design. More particularly, the present invention is directed to efficiently and accurately finding predetermined patterns in a main circuit design.

Recognizing or finding subcircuit instances in a larger circuit is widely used in the simulation, verification, and testing of integrated circuits using computer-aided design programs. Currently, the process of finding is performed using ad hoc techniques that rely on the circuit technology and implementation details. Such techniques, however, do not generalize to different subcircuit structures and do not transfer to other technologies. A publication entitled "Sub-Gemini: Identifying SubCircuits using a Fast subgraph Isomorphism Algorithm," by Ohlrich, et. al. (hereinafter "Sub-Gemini") describes a technology independent algorithm for solving this problem based on a solution to the subgraph isomorphism problem. This publication is incorporated herein by reference. SubGemini describes a use of a recursive relabeling approach to identify circuit patterns in a larger circuit. However, the SubGemini method of finding patterns in a larger circuit has flaws that, under certain circumstances, prevent the labels from having enough information to ensure an accurate identification of the instances of the subcircuits in larger circuits.

Thus, there is a need for method and system that enable a more accurate and efficient identification of patterns (i.e., subcircuits) in a larger circuit.

SUMMARY OF THE INVENTION

An accurate and efficient method and system of detecting all instances of a subcircuit in a larger circuit are disclosed. Embodiments of the present invention disclose unidirectional relabeling of vertices of the subcircuit and the larger circuit to enable much deeper recursion of the relabeling method so that the labels include enough information related to the circuit topology around them.

In one embodiment, a method for identifying instances of a smaller circuit in a larger circuit is disclosed. Both the smaller circuit and the larger circuit have a plurality of vertices. A vertex is one of a device or a net. The device, such a transistor, includes a Gate, a Drain, and a Source. The net is a wired connection between devices. The method includes recursively relabeling of each of the plurality of vertices until labels of all neighboring vertices of a selected vertex are zero. The neighboring vertices of a vertex are vertices that are directly connected to the vertex. Each successive iteration of the relabeling uses labels of each of the plurality of vertices after a previous iteration of the relabeling. Then, a recursive circuit tracing operation is performed starting from the selected vertex until each of the plurality of vertices in the smaller circuit is matched with one of the plurality of vertices in the larger circuit. The circuit tracing operation includes matching a label of each of the plurality of vertices neighboring the selected vertex in the smaller circuit with a label of each of the plurality of vertices in the larger circuit neighboring a vertex corresponding to the selected vertex, wherein labels at a same depth of relabeling iteration is matched.

In another embodiment, a system for identifying instances of a smaller circuit in a larger circuit is disclosed. The smaller circuit and the larger circuit have a plurality of vertices. Each of the plurality of vertices is one of a device or a net. The device has a Gate, a Drain, and a Source. A processor to execute programming instructions is included in the system. The system also includes a memory to provide programming instructions execution support to the processor and a netlist data store for storing a data representation of the larger circuit and the smaller circuit. A unidirectional relabeling module is included to retrieve the data representation of the larger circuit and the smaller circuit and to perform unidirectional relabeling operations on the data representation of the larger circuit and the smaller circuit. The unidirectional relabeling operations included calculating new labels for each of the plurality of vertices in the data representation of the larger circuit and the smaller circuit wherein circuit components connected to the Gate are omitted in calculation of the new labels for each device in the plurality of vertices.

In yet another embodiment, a computer readable medium for storing programming instructions for identifying instances of a smaller circuit in a larger circuit is disclosed. The computer readable medium includes programming instructions for recursively relabeling of each of the plurality of vertices until labels of all neighboring vertices of a selected vertex are zero. The neighboring vertices of a vertex are vertices that are directly connected to the vertex. Each successive iteration of the relabeling uses labels of each of the plurality of vertices after a previous iteration of the relabeling. The computer readable medium also includes programming instructions for recursively performing circuit tracing operation starting from the selected vertex until each of the plurality of vertices in the smaller circuit is matched with one of the plurality of vertices in the larger circuit. The circuit tracing operation includes matching a label of each of the plurality of vertices neighboring the selected vertex in the smaller circuit with a label of each of the plurality of vertices in the larger circuit neighboring a vertex corresponding to the selected vertex, wherein labels at a same depth of relabeling iteration being matched.

The advantages of the embodiments of the present invention are numerous. Most notably, the systems and methods described herein provide a more accurate identification of the instances of a subcircuit in a larger circuit because the circuit tracing operations using the vertex types and/or vertex labels eliminates any false identification of the instances of a subcircuit in a larger circuit. The improvement in accuracy is achieved by providing a method of unidirectional relabeling of the vertices of circuits.

Other aspects and advantages of the present invention will become apparent from the following detailed description, taken in conjunction with the accompanying drawings, illustrating by way of example the principles of the present invention.

BRIEF DESCRIPTION OF THE DRAWINGS

The present invention can be best understood by reference to the following description taken in conjunction with the accompanying figures, in which like parts may be referred to by like numerals.

Figure 1:
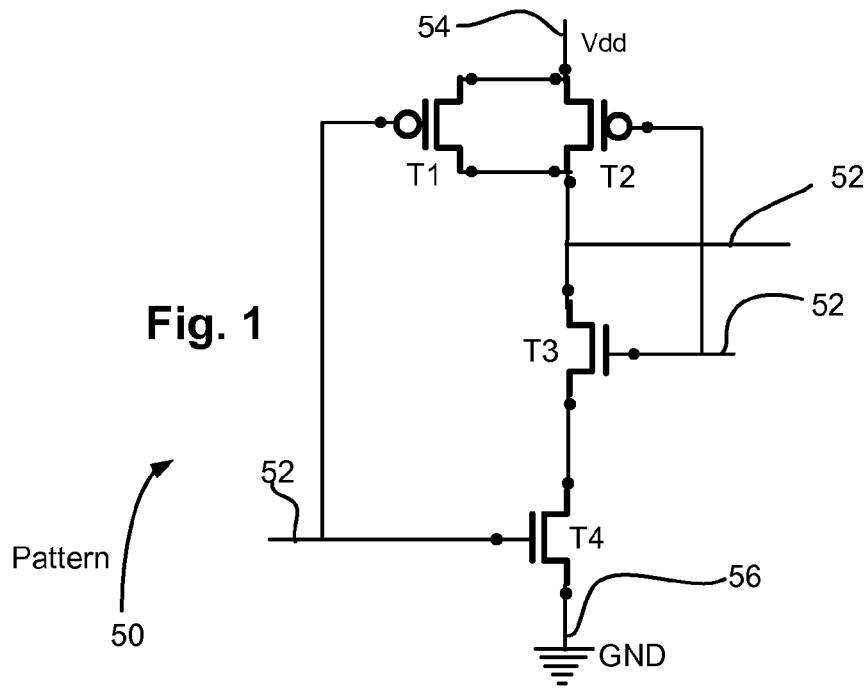
FIG. 1 illustrates an exemplary logic gate circuit (i.e., pattern), in accordance with one embodiment of the present invention.

The figures are provided in order to provide a thorough understanding of the present invention. The figures should not be construed as limiting the breath of the invention in any manner.

DETAILED DESCRIPTION OF THE INVENTION

A method of accurately identifying instances of a pattern (i.e., a smaller circuit or a subcircuit) in a larger circuit (i.e., a main netlist) is disclosed. In one embodiment, the circuit components of the pattern and the main netlist are unidirectionally relabeled recursively until no more relabeling is possible under given rules of relabeling. The highest label in the pattern is then used to identify the instances of the pattern in the main netlist. While the present invention has been particularly shown and described with reference to the foregoing preferred embodiments, those skilled in the art will understand that many variations may be made therein without departing from the spirit and scope of the invention as defined in the following claims. The scope of the invention should therefore, not be limited to the description of the invention; rather, the scope of the invention should be defined by the claims including the full scope of equivalents thereof.

The pattern, as used herein, is a circuit whose various properties and behavior are already known. For example, a NAND gate could be a pattern. The pattern has one or more devices such as transistors connected together through nets (for example, wires connecting the transistors in a logic gate). The nets may include resistors, capacitors, etc. However, for the purpose of the identification of the instances of the pattern in a larger circuit, i.e., main netlist, the nets are considered simple wire connections (i.e., circuit components such as resistors, capacitors, etc. are omitted and replaced by wire connections). One of the uses for finding the instances of a particular pattern in a main netlist is to identify a related collection of interconnected primitive devices in a circuit as a single high-level component. For example, converting a transistor netlist into a logic gate netlist involves finding the subcircuits representing gates and replacing them with the corresponding logic gates. Similarly, replacing larger known subcircuits such as flip-flops in a main netlist by "black boxes" would reduce simulation and analyzing time because the properties and characteristics of the flip-flop, for instance, are already known and do not need to be analyzed for every instance of this subcircuit in the main netlist.

In one embodiment, the process of identifying the instances of a pattern in the main netlist is performed in two phases. In the first phase, each net and device in the pattern and the main netlist is given an initial unique label. In this embodiment, the initial labels are prime numbers to minimize the possibility of number collision during recursive relabeling. Then, the nets and devices are relabeled recursively using a predefined formula (discussed in detail later in this document) for relabeling. The netlist is treated as a "graph," where both nets and devices are treated as the vertices, and the connection among the nets and devices are called "edges". This graph happens to be bipartite with the nets and devices as the two sets, i.e., all immediate neighbors of a net are devices, and all immediate neighbors of a device are nets.

In general, this process of relabeling transmits topology information laterally across the graph. The topology information is encoded in the vertex labels. That is, the information about a given vertex emanates outward by one step for each relabeling round. Conversely, with each relabeling round or iteration, the label of a given vertex encompasses topology information of a wider and wider area surrounding it. This transmission of information thus becomes an excellent way to encode a great deal of information about the pattern into a single vertex label. With labels that are the products of many relabeling iterations, it becomes very likely that the same labels appearing in the pattern and main netlist correspond to the same topologies in the surrounding area represented by that label. With this overview in mind, the following figures will illustrate example structure and functionality of sampling based runtime optimizer for efficient debugging of applications.

Figure 2:
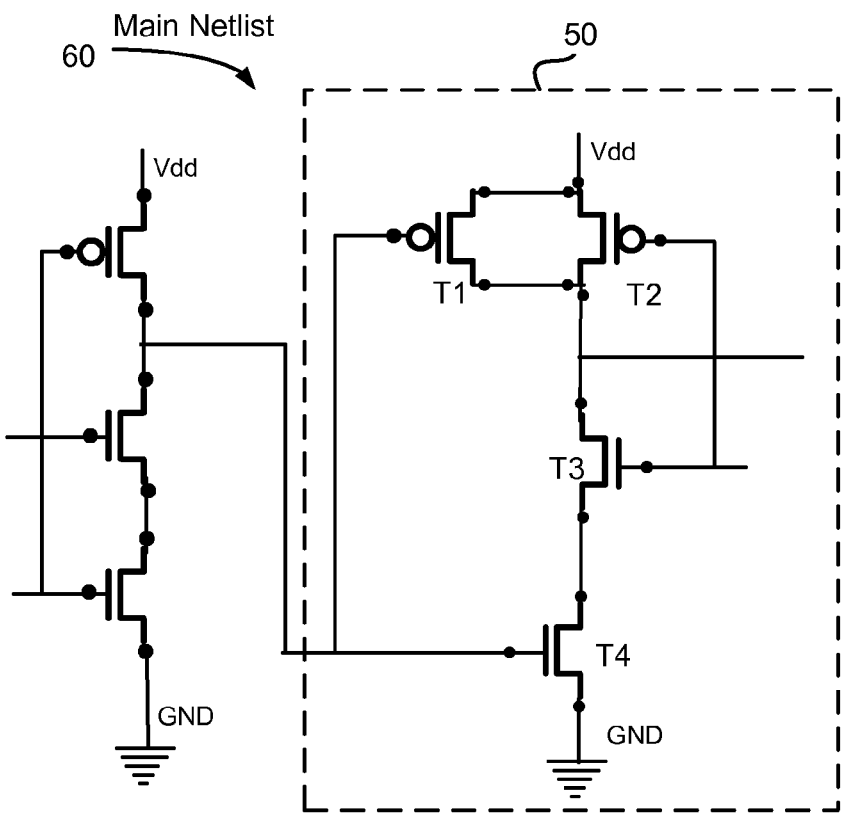
FIG. 2 illustrates an exemplary larger circuit (i.e., main netlist) that includes the pattern, in accordance with one embodiment of the present invention

FIG. 1 illustrates a transistor level representation of an exemplary circuit that will be used as a pattern 50. The pattern includes transistors T1, T2, T3, and T4 connected together through nets or wires. The pattern 50 contains a ground connection 56, a Vdd connection 54, and three I/O connections 52. FIG. 2 illustrates an exemplary main netlist 60 that includes one instance of the pattern 50.

Figure 3A:
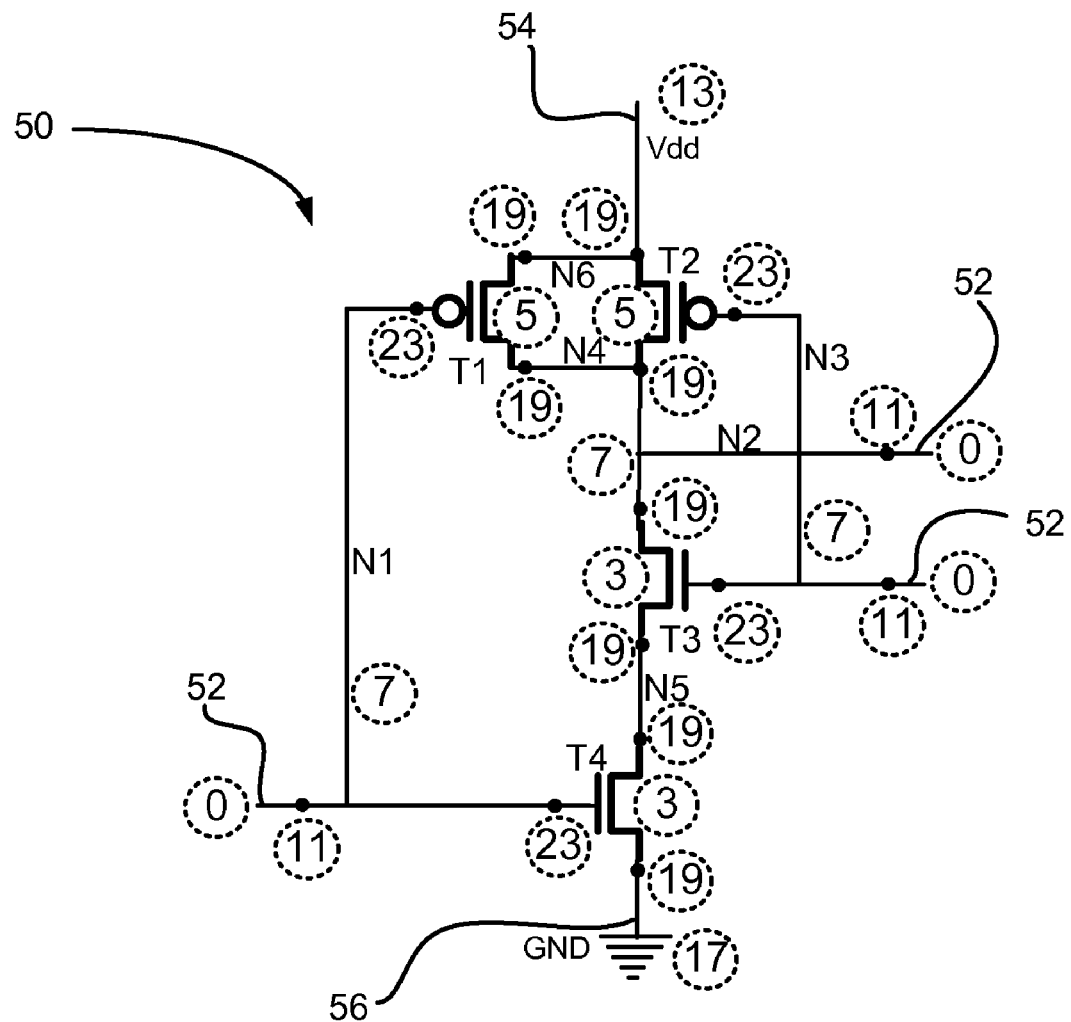
FIG. 3A illustrates exemplary initial labels for various components of the pattern, in accordance with one embodiment of the present invention.

By way of example, FIG. 3A illustrates the pattern 50 showing exemplary initial labels for various components in the pattern 50. In one embodiment, only prime numbers are used for initial labeling to avoid collision of label numbers during recursive relabeling. In another embodiment, the numbers may be chosen arbitrarily. However, choosing a distinct number for each of the component such as net, device, connection type, Vdd, GND, etc. would provide better results because during relabeling, the label will include more distinct and granular information about the topology of the circuit. In one embodiment, initial labels are applied uniformly throughout the pattern and the main netlist. Same labels are used for particular components both in the pattern 50 and the main netlist 60. For example, if an N-Transistor is given an initial label of 5, all N-Transistors in the pattern 50 and the main netlist 60 must be given the same initial label. Similarly, if a GND port is given an initial label of 17, the same number must be used throughout in the pattern as well as in the main netlist.

In one embodiment, the same label number is provided to both "Drain-to-net" and "Source-to-net" connection-types (for example, see label 19 in FIG. 3A). In other embodiment, different connection-type labels may be assigned to "Drain-to-net" and "Source-to-net" connection-types. In one embodiment, the "Gate-to-net" connection-type (for example, see label 23 in FIG. 3A) is assigned a label number that is different from the "Drain-to-net" and "Source-to-net" connection-type labels. In one embodiment, a net is a set of wires that connects two or more devices (such as transistors). The net also connects other nets or devices to the input or output ports. For example, FIG. 3A illustrates few exemplary nets such as N1, N2, N3, N4, N5, and N6 and devices T1, T2, T3, and T4. In one embodiment, the Gate-to-net connection-type label is kept different to indicate whether a net is connected to the Source/Drain terminals of a transistor or to the Gate terminal. In another embodiment, three separate connection-type labels can be assigned to the Gate, the Drain, and the Source. During the relabeling, in one embodiment, only nets and devices are relabeled. As mentioned before nets and devices are also called vertices. Note that one key requirement to making the embodiments described herein to work is to perform exactly the same initial labeling and relabeling procedures in both the pattern and the main netlist.

Still referring to FIG. 3A, a fundamental limitation of this technique is the effect of nets that are ports on the pattern. These nets will almost certainly have fewer connections in the pattern than their corresponding nets will in a valid match in the main netlist. This is due to the fact that an instance of the pattern in the main netlist must communicate with the rest of the main netlist in order to be useful. This means that even the initial labels of these nets (i.e., the nets connected to the ports) usually won't match between the pattern and the main netlist. Worse still, this mismatch of labels propagates during relabeling, along with the rest of the information that the labels hold. Thus, with each round of relabeling, successively larger areas around each port net bear invalid labels (i.e., NULL labels). In one embodiment, this problem can be solved by considering that each port net has a "kill" flag that propagates along with the relabeling. This flag can be represented simply by the use of a "null" label. Meaning, input and output ports are given initial label 0 (zero) because the topologies connected to the input and/or output are unknown (i.e., nets that are ports are given initial label 0 (zero)). Then use the following relabeling rule—"If any neighbor of a vertex has a null label, this vertex cannot be relabeled. Instead, this vertex's label becomes null as well."

Figure 3B:
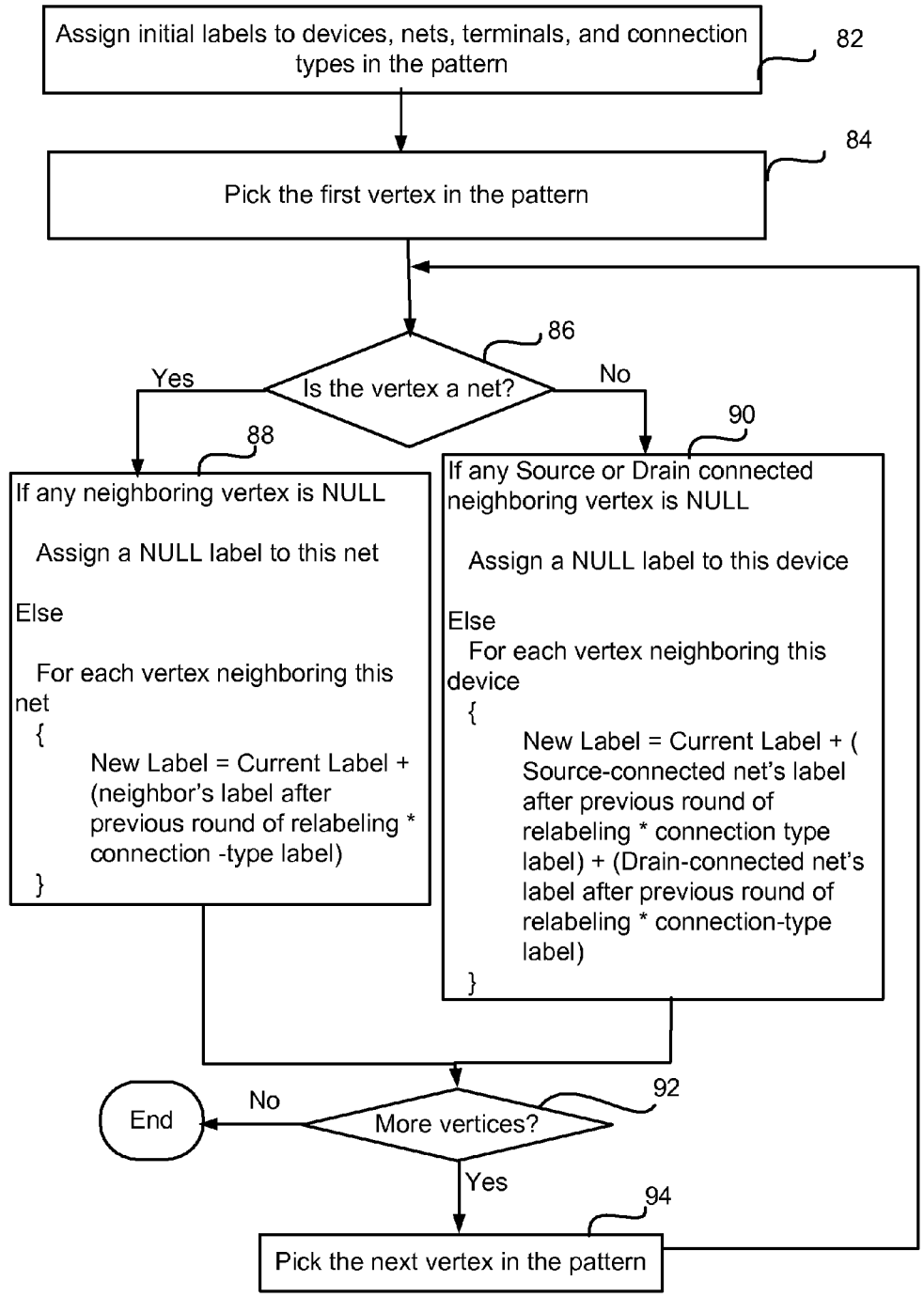
FIG. 3B illustrates a flow diagram for recursive relabeling of the vertices, in accordance with one embodiment of the present invention.
Figure 4A:
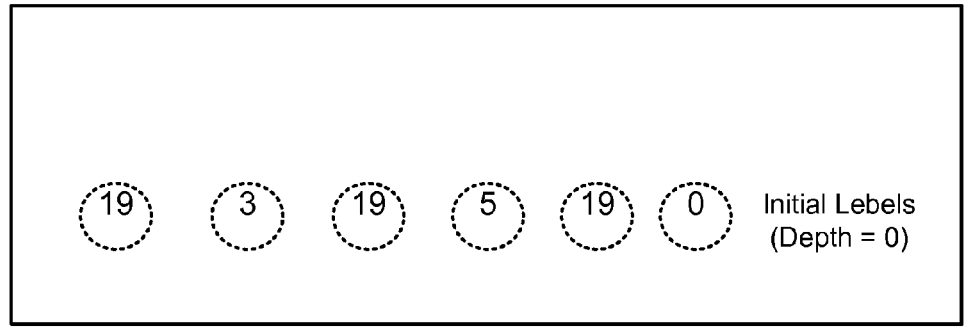
FIG. 4A-4F illustrate recalculated labels for some of the components of the patterns at different depth of recursion, in accordance with one embodiment of the present invention.
Figure 4B:
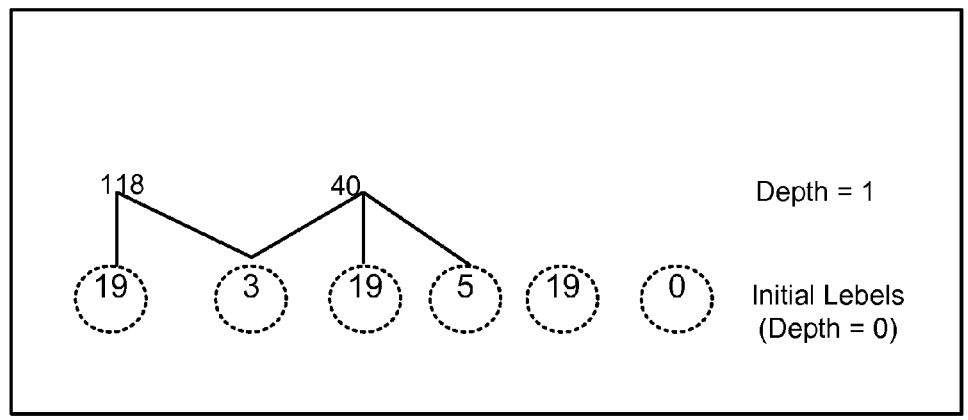
Figure 4C:
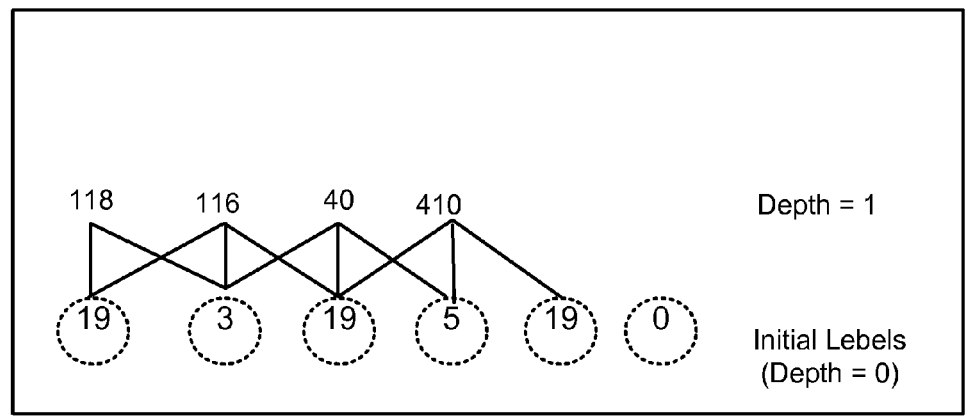
Figure 4D:
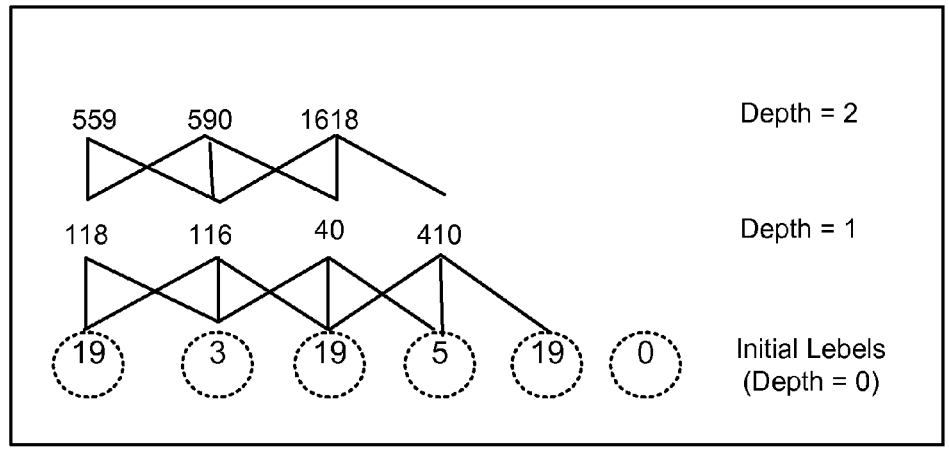
Figure 4E:
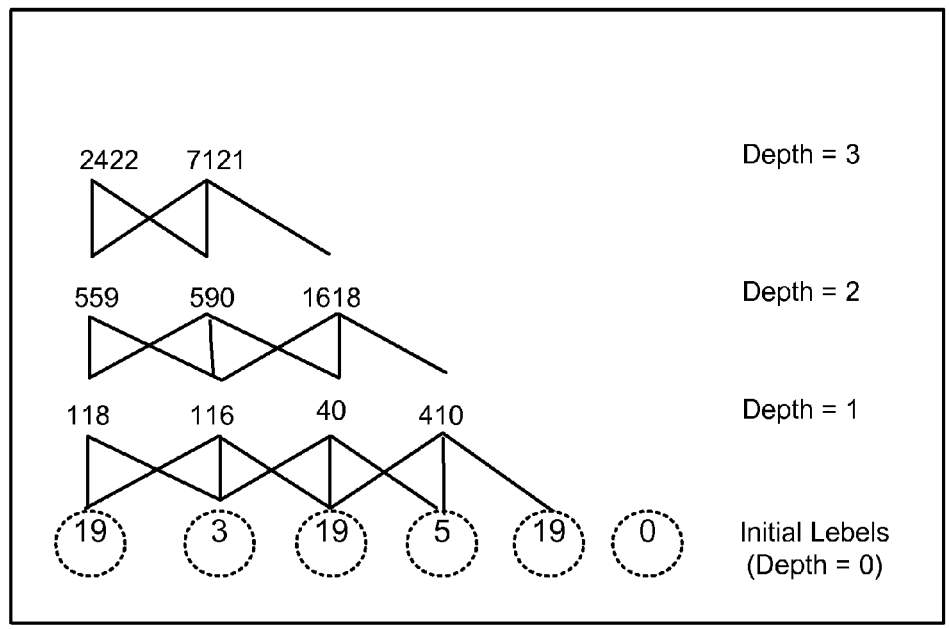
Figure 4F:
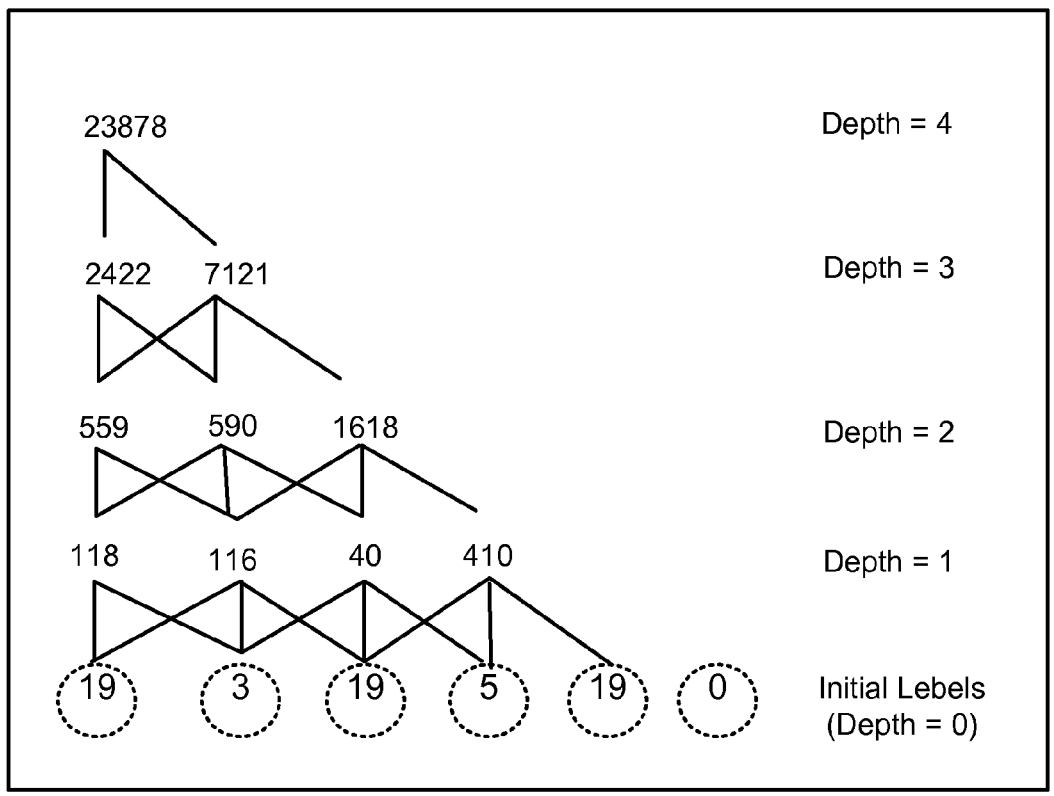

FIG. 3B illustrates a flow diagram of a process of relabeling of the vertices in the pattern. Note that the same process is also performed on the main netlist. The process of relabeling starts at operation 82 in which initial labels are assigned to devices, nets, terminals, and connection types in the pattern. The process of assigning initial labels has been described in detail in the description of FIG. 3A above. Then in operation 84, the first vertex (i.e., a device or a net) is selected. In one embodiment, any vertex can be selected from the list of all vertices because eventually all vertices will be relabeled through a recursive relabeling loop. In operation 86 a determination is made as to whether the selected vertex is a device or a net. If the selected vertex is a net, the control moves to operation 88 in which, first a determination is made whether any of the neighboring vertices connected the net is NULL. If yes, then the selected net is given a NULL label too. Otherwise, a new label of the net is calculated using the following formula:

Formula (1)

---

For each vertex neighboring the selected net
Do
{
    New label of the net = Current label of the
    net + (neighbor's label after previous
    iteration of relabeling * connection-type
    label)
}

---

Formula (1) calculates a new label for a net by multiplying the value of the label of a neighboring vertex after a previous relabeling iteration by the connection-type label (i.e., the value of the label of the connection-type that connects the net to the neighboring vertex in question) and adding to the multiplication result to the current label of the net. This process is repeated for all neighboring vertices of the selected net.

In one embodiment, a separate list of labels of each vertex after each round or iteration of the relabeling is maintained. Hence, one list is maintained for all initial labels. Another containing labels of each vertex after first round of relabeling of all vertices, yet another containing labels of each vertex after second round of relabeling, and so on. Therefore, in Formula (1), the neighbor's label after previous iteration of relabeling means that if a third round of relabeling is in progress, the labels of neighbors after second round of relabeling are used in the calculations. By extension, in round one of relabeling, initial labels of the vertices are used.

Still referring to FIG. 3B, in operation 86, if the vertex is determined to be of type device (i.e., not net), the control moves to operation 90 in which, first a determination is made whether any of the neighboring vertices connected to the Drain or the Source of the device is NULL. If yes, then the selected device is given a NULL label too. Otherwise, a new label for the selected device, in one embodiment, is calculated using the following formula:

Formula (2)

---

For each vertex neighboring the selected device
Do
{
    New label of the device = Current label of the
    device + (Source-connected net's label after
    previous round of relabeling * Connection-type
    label) + (Drain-connected net's label after
    previous round of relabeling * Connection-
    type label)
}

---

In Formula (2), the meaning of term "after previous round of relabeling" is same as described in the description of the Formula (1).

Formula (2) calculates a new label for a selected device by calculating a first multiplication result by multiplying the value of the label of the Source-connected vertex after a previous relabeling iteration by the Source connection-type label (i.e., the value of the label of the connection-type that connects the Source of the device to the neighboring vertex in question), calculating a second multiplication result multiplying the value of the label of the Drain-connected vertex after a previous relabeling iteration by the connection-type label (i.e., the value of the label of the connection-type that connects the Drain of the device to the neighboring vertex in question), adding the first multiplication resultant to the second multiplication resultant and to the current label of the selected device. This process is repeated for all neighboring vertices of the selected device.

The control is then moved to operation 92 in which a determination is made whether more vertices are remaining to be relabeled in this round of relabeling. If no vertex is left to be relabeled in this round of relabeling, the process ends. However, if more vertices are remaining to be relabeled in this round of relabeling, the control moves to operation 94 in which the next vertex is selected and then the control moves to operation 86 again. When the process ends, one round of relabeling is finished. The new labels are stored in a separate list for use in the next round of relabeling. These lists are stored in a non-volatile data store. In one embodiment, each list includes a number representing a depth of relabeling, an identification of each vertex in the circuit and the label of the vertex after that particular depth of relabeling. An appropriate indexing of the tabular data may be employed to facilitate easy data management and access. The lists may be stored in a relational database or a similar data store or in a file in the file system. In different embodiments, the process described in FIG. 3B can also be used both in unidirectional relabeling and in bidirectional relabeling.

As explained earlier, the "kill" signal propagates from the ports to the vertices in the pattern (or, in main netlist). In one embodiment, the relabeling process ends when no more devices in the pattern (or in the main netlist) can be relabeled. In other embodiments, the relabeling can be stopped earlier if a determination is made that the remaining non-zero labels contain enough topology information to facilitate the pattern identification in the main netlist.

It should be noted that the formula for calculating a new label for a device (i.e., Formula (2)) does not include the net connected to the Gate of the device. In other embodiments, Formula (2) can be modified to include Gate connected nets and exclude either the Drain connected net or the Source connected net or both. In other words, the asymmetry in the graph is being advantageously utilized. This determination can be made based on the topology of the pattern. If there are more ports (i.e., input/output, in one embodiment) connected to the Gate, the Gate connected net is not included in the formula. One reason behind not selecting one of the terminals is to delay the propagation of the "kill" signal. This solves a big issue that is present in SubGemini. SubGemini method is useless in many cases such as in a pattern in which all or most Gates are connected to the ports (for example, a NAND gate). By SubGemini method of recalculating the labels (in a NAND gate for example), no round of relabeling is possible because every device is touching a "kill" signal (i.e., a port with the label "0"). Hence, in this case, according to SubGemini, only initial labels can be used for the identification of the pattern in the main netlist. However, Formula (2), in various embodiments, solves this issue by delaying the propagation of the "kill" signal. Therefore, several iterations of relabeling is possible even in the cases such as a NAND gate pattern. Furthermore, to achieve an optimal depth of iterations, Formula (2) can be readily adjusted to include the Gate connected nets and to exclude either the Drain connected net or the Source connected net depending on a particular type of pattern.

As mentioned earlier, the main netlist is also subjected to the same process of relabeling as illustrated in FIG. 3B. The same initial labels as used in the pattern for different types of vertices and connection types are also used for the main netlist. Further, exactly the same Formula (1) and Formula (2), as used for the pattern during the execution of operations as illustrated in FIG. 3B, are also used for the main netlist. Because the main netlist includes a larger circuit, the ports are generally far away from various vertices in the main netlist, comparatively more relabeling iterations are possible in the main netlist (due to comparatively delayed "kill" signal propagation to the inner devices in the main netlist). However, because the pattern identification is performed by comparing the labels at a same depth of relabeling, the main netlist relabeling iterations are performed only until the depth of relabeling equivalent to the final depth of relabeling in the pattern is reached.

Moving now to FIGS. 4A-4F which exemplarily illustrate a "shrinking" number of vertices and increasing label numbers after each iteration of relabeling. As mentioned in the description of FIG. 3B, the "shrinking" occurs due to propagation of the "kill" signal inward. As apparent, the number of remaining vertices shrinks with each round of relabeling and finally, in one embodiment, no additional non-zero labels can be recorded in the pattern. Alternatively, the process of performing the relabeling iterations may be ended when a desired depth or relabeling is reached and a determination is made that the labels at that depth contain enough topology information to enable the identification of the instances of the pattern in the main netlist. Term "depth" as used herein refers to number of rounds or iterations of relabeling. In one embodiment, the initial labels are considered at depth 0 (zero).

Figure 5A:
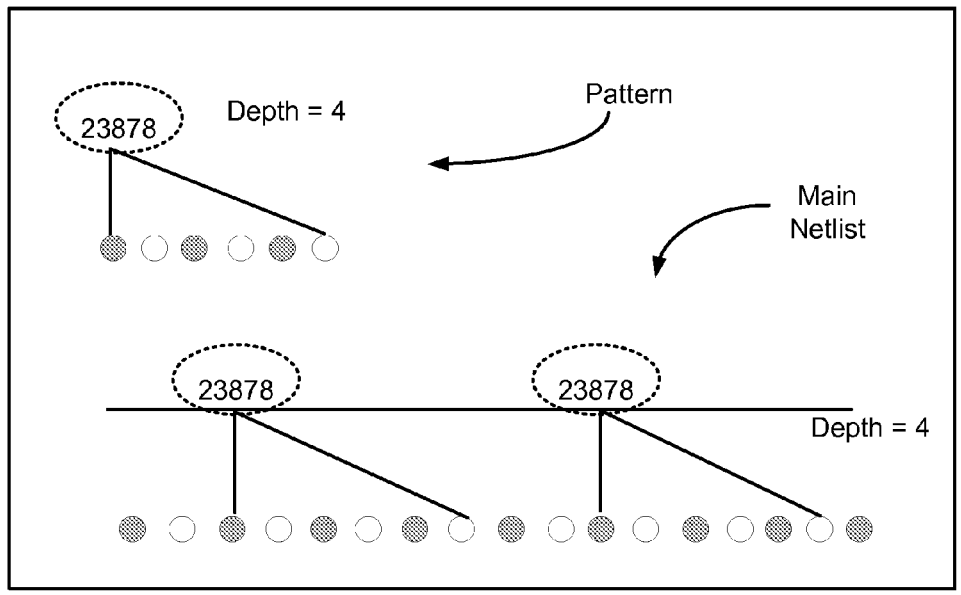
FIG. 5A-5C illustrate identifying the instances of the pattern in the main netlist based on the recalculated labels, and identifying a seed vertex in the pattern, in accordance with one embodiment of the present invention.

FIG. 5A exemplarily illustrates the process of identification of the instances of the pattern in the main netlist. The identification is performed by comparing label numbers at a same depth both in the pattern and the main netlist. For example, if at depth=4, a particular label in the pattern has the label "23878", there is a strong possibility that all labels in the main netlist with label '23878' at depth=4 represent the same topology that is present in the pattern and is represented by the label "23878". In other embodiments, labels at a lower depth (such as depth=3 in the example illustrated in FIGS. 4A-4F) may be used for comparison, if for some reason, a comparison of the labels at the maximum possible depth is not suitable. However, there is still a small possibility that even though the labels match, the actual topologies represented by these labels are different. Therefore, the embodiments of the invention also provide to check if the actual topologies also match before finalizing the identification process.

Figure 5B:
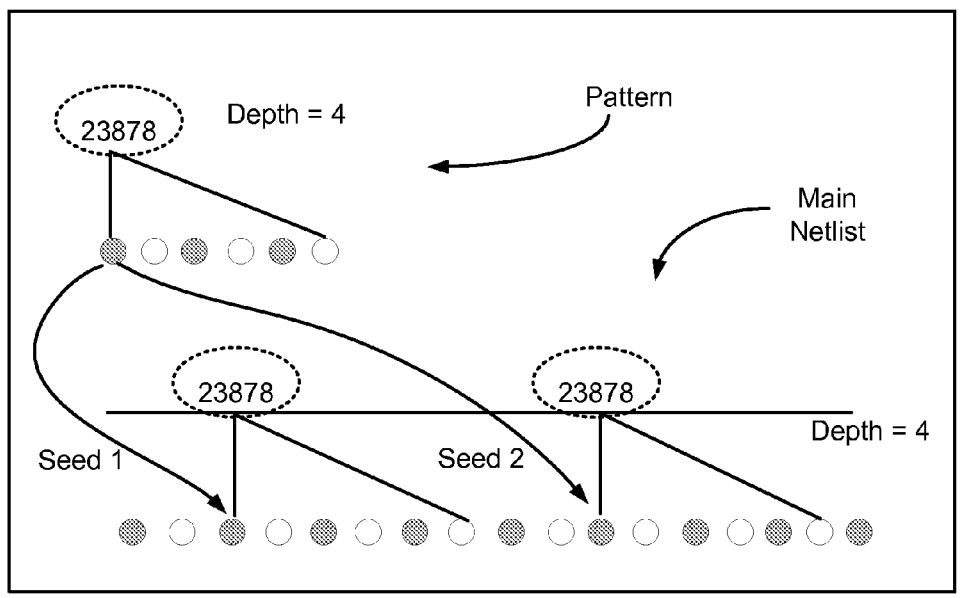
Figure 5C:
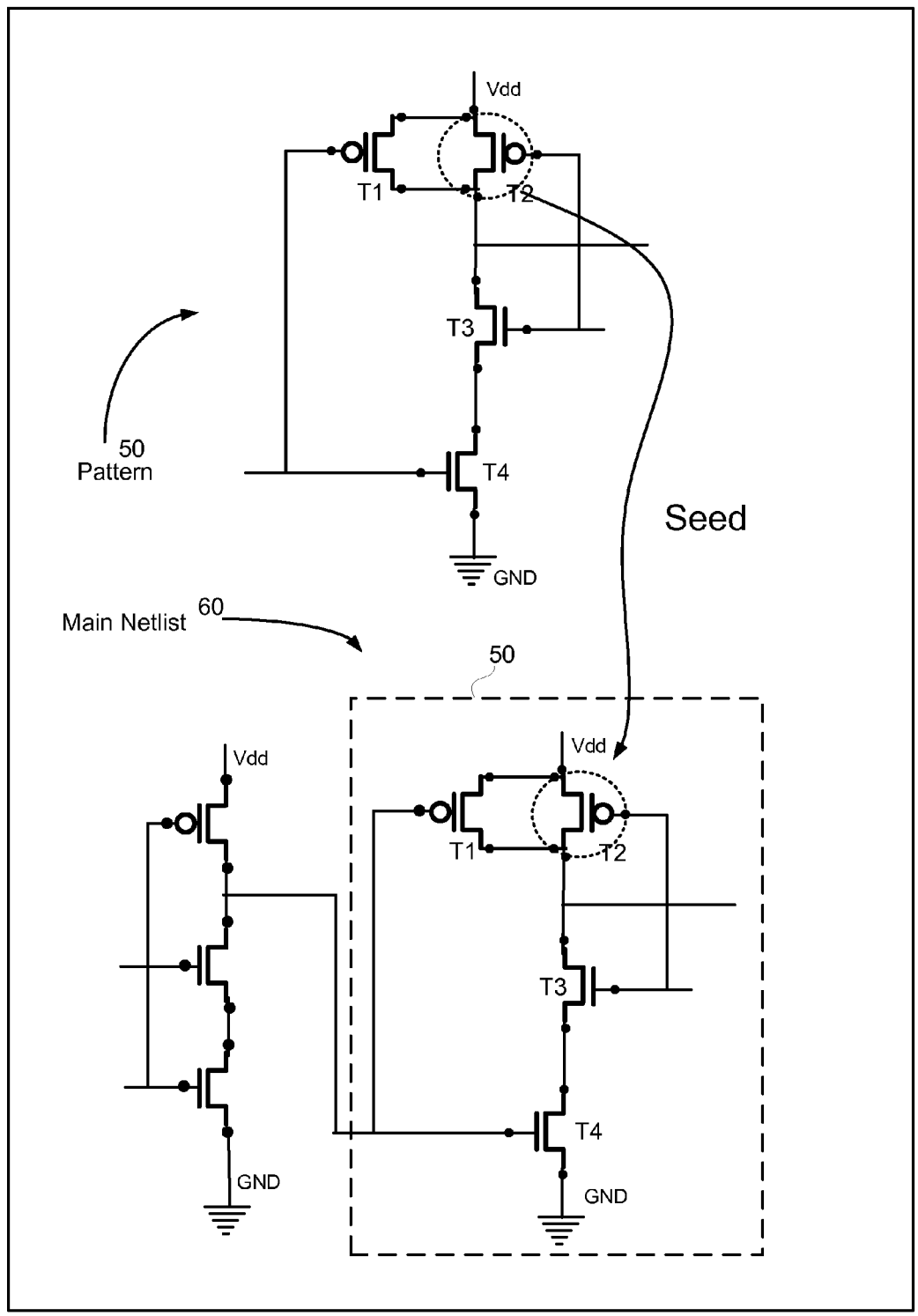

By way of example, FIG. 5B illustrates one embodiment of a "Phase-2" process for further verifying the identification of the instances of a pattern in the main netlist, the process of relabeling, as illustrated in FIG. 3B, being "Phase-1". In Phase-2, a seed vertex is identified. In one embodiment, the seed vertex is a vertex that is represented by the label used for the comparison of labels in "Phase-1", as illustrated in FIG. 5A. FIG. 5C, by way of example, provides a clearer view of a seed vertex (or node) at the circuit level.

Figure 6A:
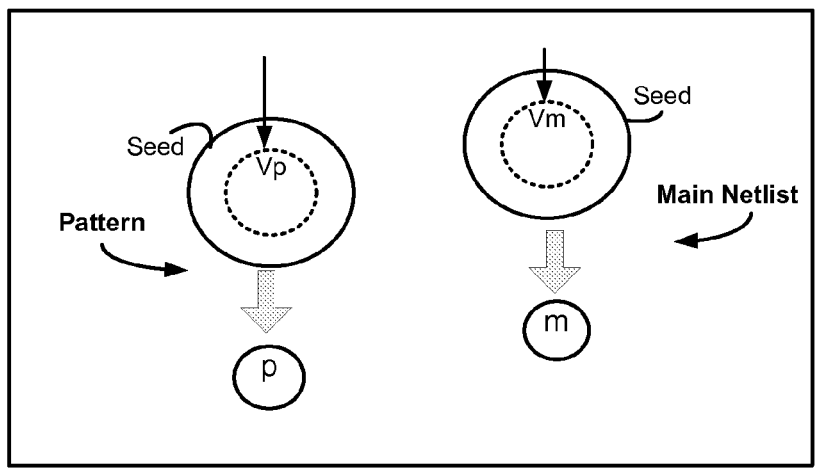
FIG. 6A-6C illustrate exemplary reverse checking of the labels to eliminate any false label match in the main netlist, in accordance with one embodiment of the present invention.
Figure 6B:
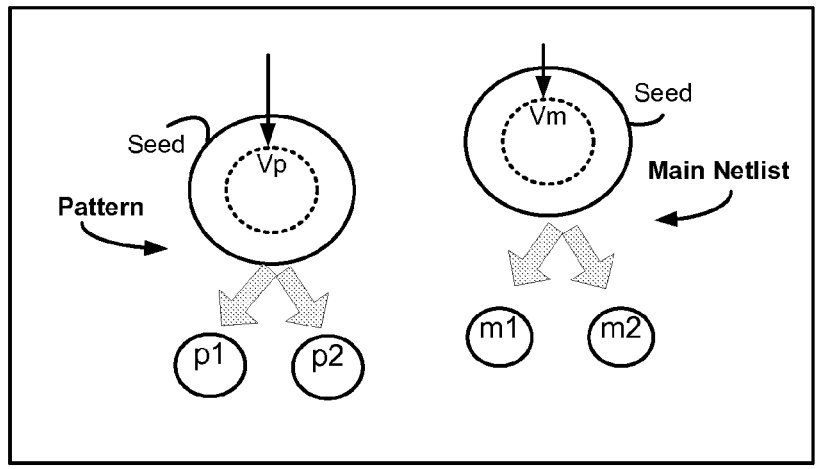
Figure 6C:
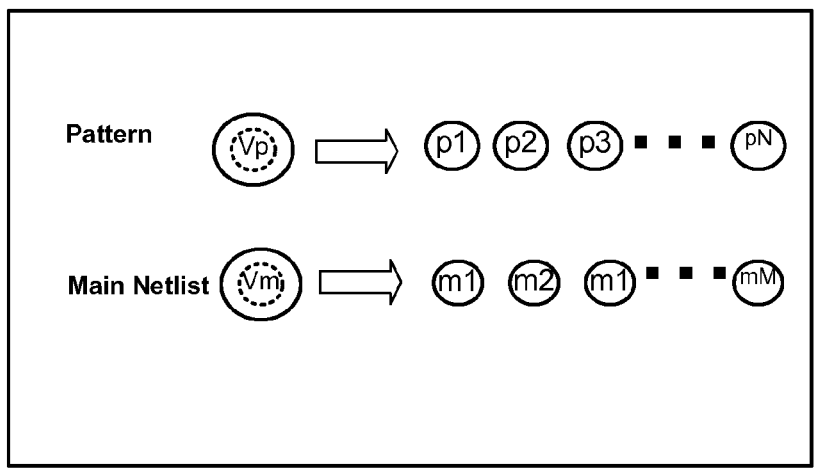

FIGS. 6A-6C exemplarily illustrates further steps of Phase-2 after a selection of a seed vertex. Starting from the seed node and working in parallel on both the pattern and the main netlist, the topology around the seed is checked for similarities. For example, suppose T2 (in FIG. 5C) is a seed node or vertex. The "Phase-2" process includes the following operations. First check if the seed vertices in the pattern and the main netlist correspond to same type of vertex (i.e., transistor T2 in the current example). Check is then made to see how many vertices are connected to the transistor T2. If only one vertex is connected to T2 in both the pattern and the main netlist (FIG. 6A "p" and "m"), check to see if "p" and "m" are same type of vertices. If yes, move to "p" in the pattern and "m" in the main netlist and repeat the previous operation (i.e., check to see how many vertices are connected to "p" and "m" and so on). If there are two vertices connected to "p" and "m", check if "p1" is same as "m1" and "p2" is same as "m2". If fails, check if "p1" is same as "m2" and "p2" is same as "m1" (see FIG. 6B). If any of these checks pass, move forward to either "p1" or "p2" and keep repeating the previous operation until a mismatch is found, or there are no more unvisited vertices in the pattern.

Referring to FIG. 6C, if there are multiple vertices connected to the seed vertex in the checking path, a nested loop is used to cover all "p#" and "m#" pairs in one embodiment. In one embodiment, a net-to-device pair comparison is made. Note that the seed or a vertex in checking path in the pattern may be connected to different numbers of other vertices compared to the seed or similar vertex in the main netlist. Therefore, as illustrated in FIG. 6C, the number "N" (as used in term "pN" in FIG. 6C) may be different from the number "M" (as used in term "mM" in FIG. 6C). Typically, N will be less than or equal to M if node vp (FIG. 6C) is a connected to a I/O port. Otherwise, M should be equal to N. Further, if unique pairs are found, these pairs are iterated first before moving further in the checking path. If any ambiguous pair is found, try (p1,m1), then if fails try (p1,m2), then (p1,m3), etc. within the set of ambiguous pairings. In one embodiment, the pattern neighbor list is reordered and checking is performed again. If case of a failure, this reordering is attempted again and again until no more unique reordering is possible.

Term "working in parallel" as used herein means that exactly same steps are taking in parallel on both the pattern and the main netlist. For example, if the process is implemented in software, two "threads" or two "processes" executing in simultaneously can be used. However, "working in parallel" does not imply that any two similar steps are being performed exactly at the same time. These steps could be performed at a delay so long as one operation step being performed on the pattern can be repeated in the main netlist.

If in "Phase-2" a mismatch if found during the vertices retracing, the instance of the pattern in which the mismatch was found could have been falsely identified during "Phase-1" identification. If "Phase-2" retracing is successful, the identification process is successfully performed and the pattern matching of "Phase-1" is confirmed. In one embodiment, "Phase-2" may be omitted if the process performing entity determines that the "Phase-1" results are accurate within an acceptable margin or errors.

Figure 7:
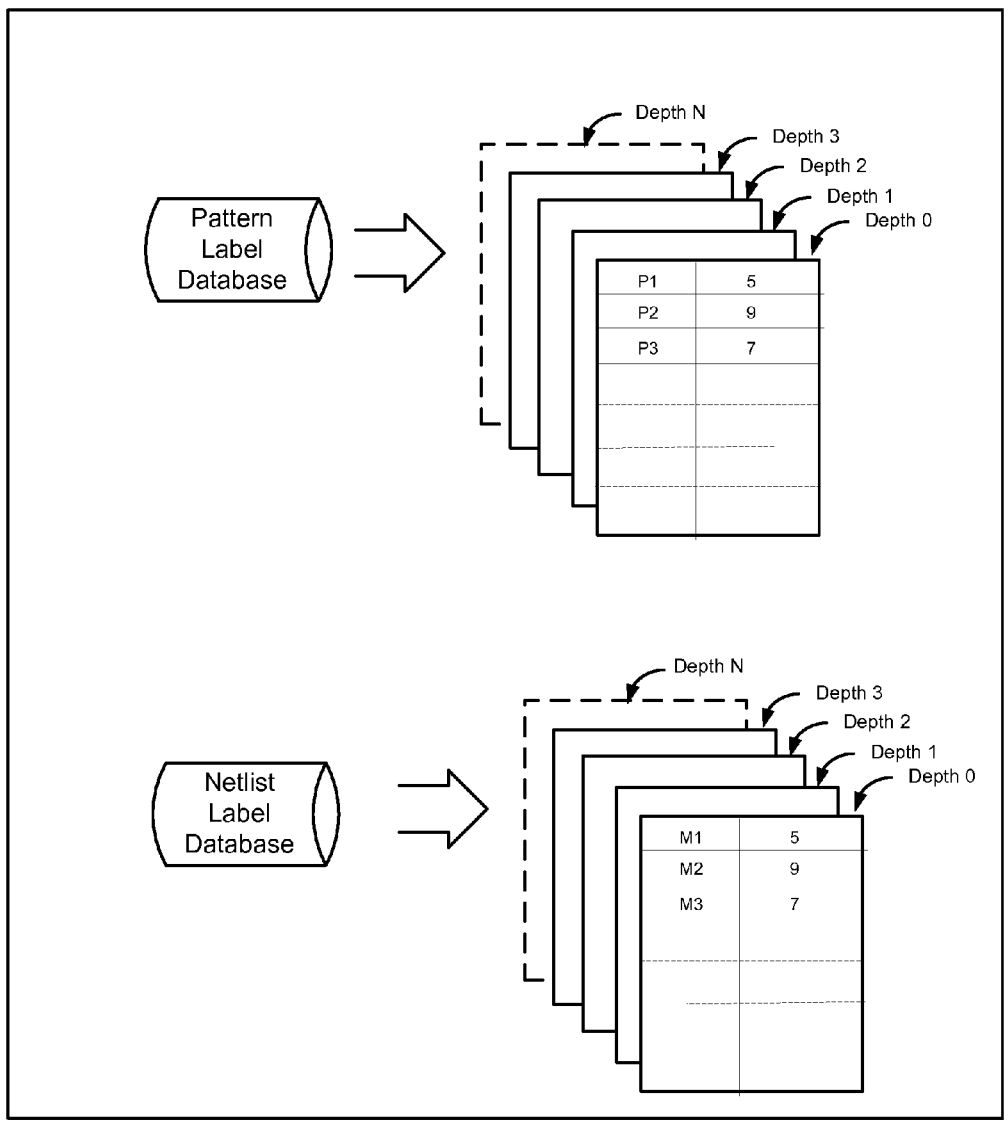
FIG. 7 illustrates exemplary data structures for storing labels of vertices after each iteration of relabeling, in accordance with one embodiment of the present invention.

FIG. 7 illustrates exemplary data structures of a pattern label database and a netlist label database. In one embodiment, the pattern label database and the netlist label database are maintained in a relational database management system. In other embodiments, these databases can be maintained in any type of database management system so long as the stored data is searchable. In one embodiment, the label data of each vertex after each iteration of relabeling according to the "Phase-1" is stored in a separate table. In another embodiment, a single table can be used to store the label data of each vertex categorized by the iteration number or the depth of the relabeling iterations. In yet another embodiment, the label data pertaining to the pattern and the label data pertaining to the main netlist can be stored together in a single table using an appropriate differentiating identification associated with each line in the database table.

In one embodiment, each vertex in the pattern and the main netlist is given a unique identity. This unique identify of a vertex along with the vertex label is stored together after each relabeling iteration.

Figure 8:
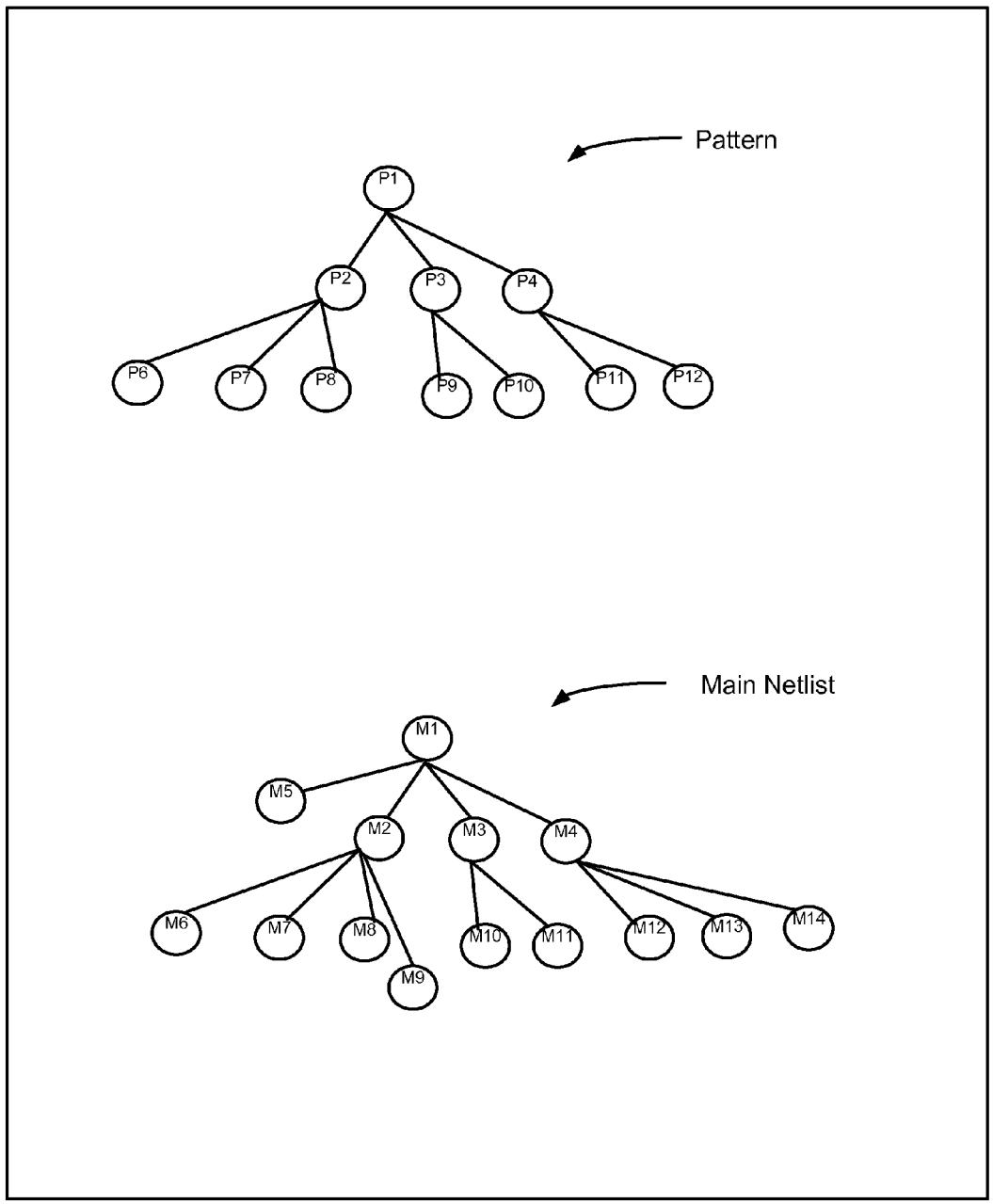
FIG. 8 illustrates exemplary node graphs to describe matching of the nodes in the pattern with the nodes in the main netlist, in accordance with one embodiment of the present invention.

FIG. 8 illustrates exemplary node graphs to describe by the way of examples a process of circuit tracing of the vertices in "Phase-2". One aspect of the circuit tracing is illustrated and described by FIGS. 6A-6C in which the "Phase-2" process is performed to verify the pattern matching of "Phase-1" to eliminate any false identification of the subcircuit in the main netlist. As described earlier in the description of FIGS. 6A-6C, in one embodiment, this verification is performed by attempting to trace the circuit outwards from the seed vertices both in the pattern and the main netlist to match the neighboring vertices recursively. If all the vertices in the pattern are matched with the corresponding vertices in the main netlist, the subcircuit identification of "Phase-1" is confirmed. In another embodiment, the labels of the vertices are used in the matching operation. In yet another embodiment, the matching operation includes both the vertex type checking (as described in FIGS. 6A-6C) and the label checking. In other embodiments, other methods of circuit tracing can be employed so long as all vertices in the pattern can be matched with corresponding vertices in the main netlist.

In the label checking operation, after seed vertices are identified in the pattern and in the main netlist, the directly connected neighboring vertices are counted. For example, in FIG. 8, the pattern includes a seed vertex P1, which has three neighboring vertices P2, P3, and P4. If the main netlist has less number of neighboring vertices to a corresponding seed vertex in the main netlist, the matching operation fails and the matching operation is then attempted on another seed vertex in the main netlist. However, since the pattern inside the main netlist may be connected to other circuit components, the existence of more neighboring vertices is not an indication of mismatch.

Then, each neighboring vertex in the pattern is attempted to be matched with a corresponding neighboring vertex in the main netlist. For example, P2 is attempted to be matched (or paired) with any of M2, M3, M4 and M5. In one embodiment, the term "matching" means comparing the labels of the vertices at a same depth level. In one embodiment, if pattern vertex P2 has a max labeling depth of 3, then we will also look to the labels of M2, M3, M5, and M5 at depth=3. In other embodiments, the label at a depth below the pattern vertex's max labeling depth can also be used, as long as the labels from the same depth of the main-netlist vertices are used for this vertex pairing operation. This will not impact the functionality, but the performance will generally be best if the max-depth pattern labels are used. As described earlier, the label data of each vertex after each relabeling iteration along with the depth information and unique identification of each vertex is stored in a database (see FIG. 7) during the "Phase-1" operation. This label data is reused in the circuit tracing operation. If the label of any one of M2, M3, M4 and M5 matches with the label of P2, P2 is marked as matched and this marking flag is stored in a database or a data store. This process is repeated for remaining neighboring vertices, i.e., P3 and P4. Then, this same process is repeated for P6, P7, P8, and other remaining vertices in the pattern.

However, if for instance the label of P2 matches with more than one corresponding vertex in the main netlist (for example, P2 matches with M3 and M4 both), there is an ambiguity as to which one of M3 and M4 is a good match. To ascertain a good match, further matching is attempted in the neighboring vertices of P2 with the children nodes of M3 and M4 separately. A match is not confirmed until all children of a vertex are matched. For example, the children of P2 are attempted to be matched with the children of M4 recursively to make sure there is not false match. If any mismatch is found at any level, the match is discarded. When all children of P1 are matches, the subcircuit identification of "Phase-1" process is confirmed. In one embodiment, a parallel processing is employed to enhance the performance of matching of the labels of vertices at various levels. It should be noted that the process of verification of the circuit identification as described throughout this document can be applied both in "depth-first" or "breadth-first" pairing techniques, or any combination of the two, or any other manner in which the pattern and the main netlist topologies are traced in parallel.

As described earlier, the label of a vertex contains the topology information of the circuit around the vertex. Note that the initial labels (i.e., labels are depth=0) don't contain surrounding topology information. These initials labels have information of the nets or devices by themselves. Therefore, comparing the same depth labels of the vertices provides improved and efficient way of verifying the subcircuit identification. This circuit tracing using the vertices labels can be performed alone or in combination of the circuit tracing process using the vertex types as described in FIGS. 6A-6C. This circuit tracing process using vertex or vertices labels improves the identification process by eliminating any false identification of the subcircuits in "Phase-1". One aspect of the improvement is apparent from the fact that the circuit tracing using the vertex types, in one embodiment, does not differentiate between the Drain connected and Source connected nets. Hence, there is a chance of misidentification when the pattern matches in all respect except that at least one of the devices has the Drain and Source connection reversed. The circuit tracing process using the vertex labels eliminate this possibility because if the Drain and Source are interchanged, the node graph will probably also change and would lead to label mismatches. Also, it may be noted that there can be "true" symmetries within a pattern either due to the source/drain interchangeability, or due to other structures. In such cases, there are multiple different "right" ways to match up vertices with a true match in the main netlist. The "phase-2" process as described herein, in one embodiment, will accept the first configuration it happens to come across. The mapping may end up different from what a human observer might have expected, but it will be topologically equivalent.

Figure 9:
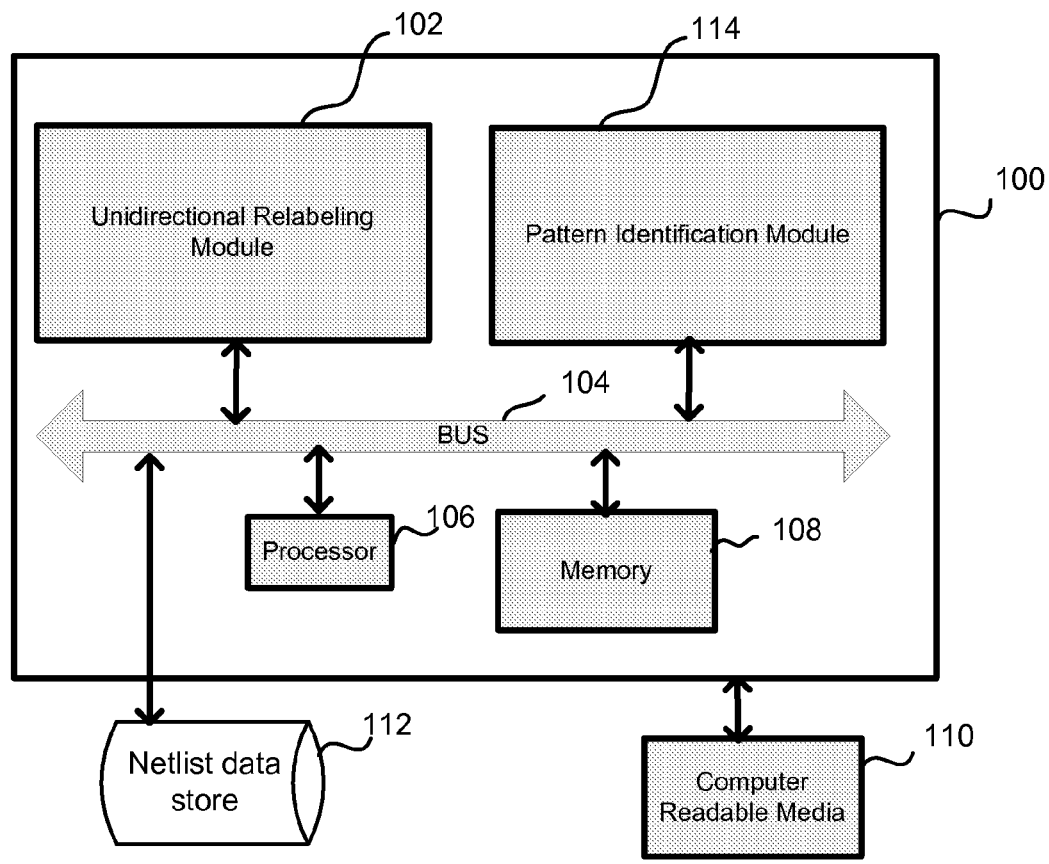
FIG. 9 illustrates an exemplary computer system to perform unidirectional relabeling, in accordance with one embodiment of the present invention.

FIG. 9 illustrates an exemplary computer system 100 for performing the process of relabeling of vertex in order to identify the instances of the pattern in the main netlist. Note that many components of the computer system 100 that are well known to be a part of a computer system are omitted for clarity. The computer system 100 includes a processor 106, a memory 108, a bus 104, and a Unidirectional Relabeling Module 102. The computer system 100 also includes a Pattern Identification Module 114. The Unidirectional Relabeling Module 102, in one embodiment, is in communication with an external Netlist data store 112 to receive the patterns and netlists to be processed. A computer readable media 110 is also included in one embodiment to provide storage of data and programming instructions. The Unidirectional Relabeling Module 102 and the Pattern Identification Module 114 can be implemented in hardware or software. The Unidirectional Relabeling Module 102 performs initial and recursive unidirectional relabeling of the vertices in the pattern and the main netlist. The Pattern Identification Module 114 performs the task of circuit tracing (as described in FIGS. 6A-6C and FIG. 8) of the pattern in the main netlist based on the results of the relabeling operations.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The programming modules, page modules, and, sub-systems described in this document can be implemented using a programming language such as Flash, Ruby, JAVA, C++, C, C#, Visual Basic, JAVA Script, PHP, XML, HTML etc., or a combination of programming languages. Commonly available application programming interface (API) such as HTTP API, XML API and parsers etc. are used in the implementation of the programming modules. As would be known to those skilled in the art that the components and functionality described above and elsewhere in this document may be implemented on any desktop operating system which provides a support for a display screen, such as different versions of Microsoft Windows, Apple Mac, Unix/X-Windows, Linux etc. using any programming language suitable for desktop software development.

The programming modules and ancillary software components, including configuration file or files, along with setup files required for performing the process of relabeling of the vertices and related functionality as described in this document, are stored on a computer readable medium. Any computer medium such as a flash drive, a CD-ROM disk, an optical disk, a floppy disk, a hard drive, a shared drive, and an storage suitable for providing downloads from connected computers, could be used for storing the programming modules and ancillary software components. It would be known to a person skilled in the art that any storage medium could be used for storing these software components so long as the storage medium can be read by a computer system.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

The invention can also be embodied as computer readable code on a computer readable storage medium. The computer readable storage medium is any data storage device that can store data, which can thereafter be read by a computer system. Examples of the computer readable storage medium include hard drives, network attached storage (NAS), read-only memory, random-access memory, CD-ROMs, CD-Rs, CD-RWs, DVDs, Flash, magnetic tapes, and other optical and non-optical data storage devices.

While this invention has been described in terms of several preferable embodiments, it will be appreciated that those skilled in the art upon reading the specifications and studying the drawings will realize various alternation, additions, permutations and equivalents thereof. It is therefore intended that the present invention includes all such alterations, additions, permutations, and equivalents as fall within the true spirit and scope of the invention.

What is claimed is:

1. A method for identifying instances of a smaller circuit in a larger circuit, both the smaller circuit and the larger circuit having a plurality of vertices, each of the plurality of vertices is one of a device or a net, the device having a Gate, a Drain, and a Source, the method being executed by a processor comprising:

recursively relabeling of each of the plurality of vertices until labels of all neighboring vertices of a selected vertex are NULL, the neighboring vertices of a vertex are vertices that are directly connected to the vertex, wherein each successive iteration of the relabeling uses labels of each of the plurality of vertices after a previous iteration of the relabeling; and recursively performing circuit tracing operation starting from the selected vertex until each of the plurality of vertices in the smaller circuit is matched with one of the plurality of vertices in the larger circuit, the circuit tracing operation includes matching a label of each of the plurality of vertices neighboring the selected vertex in the smaller circuit with a label of each of the plurality of vertices in the larger circuit neighboring a vertex corresponding to the selected vertex, wherein labels at a same depth of relabeling iteration being matched, and wherein an identification of the smaller circuit in the larger circuit is performed by comparing a label of a selected vertex of the smaller circuit with a plurality of labels in the larger circuit, wherein the comparing of the label is performed after a same number of relabeling iterations has been performed on both the smaller circuit and the larger circuit.

2. The method as recited in claim 1, wherein the relabeling includes assigning one initial unique label to each of the plurality of vertices, each of a plurality of connection-types, power connection, and ground connection in the smaller circuit and the larger circuit, a NULL label being assigned to each of an input/output ports and a same initial unique label is assigned to same types of circuit components.

3. The method as recited in claim 1, wherein the relabeling includes storing new labels at each relabeling iteration depth of each of the plurality of vertices both in the smaller circuit and the larger circuit in a data store.

4. The method as recited in claim 1, wherein the relabeling includes relabeling each of the plurality of vertices using labels of neighboring vertices.

5. The method as recited in claim 1, wherein the relabeling of each net in the plurality of vertices includes calculating a new label for the each net using labels of devices in the plurality of vertices, labels of the power connection and ground connection, and connection-type labels that are directly connected to the each net, wherein the labels of the devices after a previous iteration of the relabeling being used in calculating the new label of the each net.

6. The method as recited in claim 1, wherein the relabeling of each device in the plurality of vertices includes calculating a new label for the each device using labels of the circuit components including nets, power connection, ground, connection-types that are directly connected to the Drain and the Source of the each device, wherein the labels of nets in the plurality of vertices after a previous iteration of the relabeling being used in calculating the new label of the each device.

7. The method as recited in claim 5, wherein in the calculating of the new label for the each net, the new label of the each net is made NULL if the label of a vertex that is directly connected to the each net is NULL.

8. The method as recited in claim 6, wherein in the calculating of the new label for the each device, the new label of the each device is made NULL if the label of a vertex that is directly connected to the Drain or the Source of the each device is NULL.

9. The method as recited in claim 1, wherein the recursive relabeling ends when a user selectable depth of iteration is reached.

10. The method as recited in claim 1, wherein an identification of the smaller circuit in the larger circuit is performed by comparing a label of a selected vertex of the smaller circuit with a plurality of labels in the larger circuit, wherein the comparing of the label is performed after a same number of relabeling iterations has been performed on both the smaller circuit and the larger circuit.

11. The method as recited in claim 1, further comprising performing a circuit trace method if at least one match of the label of the selected vertex is found in the larger circuit, the circuit trace method includes identifying a seed vertex and comparing all neighboring vertices of the seed vertex both in the smaller circuit and the larger circuit.

12. The method as recited in claim 1, wherein the circuit tracing operation further includes matching a type of each of the plurality of vertices neighboring the selected vertex in the smaller circuit with a type of each of the plurality of vertices in the larger circuit neighboring a vertex corresponding to the selected vertex.

13. A method for identifying instances of a smaller circuit in a larger circuit, both the smaller circuit and the larger circuit having a plurality of vertices, each of the plurality of vertices is one of a device or a net, the device having a Gate, a Drain, and a Source, the method being executed by a processor comprising:

recursively relabeling of each of the plurality of vertices until labels of all neighboring vertices of a selected vertex are NULL, the neighboring vertices of a vertex are vertices that are directly connected to the vertex, wherein each successive iteration of the relabeling uses labels of each of the plurality of vertices after a previous iteration of the relabeling; and recursively performing circuit tracing operation starting from the selected vertex until each of the plurality of vertices in the smaller circuit is matched with one of the plurality of vertices in the larger circuit, the circuit tracing operation includes matching a label of each of the plurality of vertices neighboring the selected vertex in the smaller circuit with a label of each of the plurality of vertices in the larger circuit neighboring a vertex corresponding to the selected vertex, wherein labels at a same depth of relabeling iteration being matched, and wherein the relabeling of each device in the plurality of vertices being performed using a formula: New label=Current label+(Source-connected net's label after the previous iteration*Connection-type label)+(Drain-connected net's label after the previous iteration*Connection-type label).

14. A non-transitory computer readable medium for storing programming instructions for identifying instances of a smaller circuit in a larger circuit, both the smaller circuit and the larger circuit having a plurality of vertices, each of the plurality of vertices is one of a device or a net, the device having a Gate, a Drain, and a Source, the method comprising:

programming instructions for recursively relabeling of each of the plurality of vertices until labels of all neighboring vertices of a selected vertex are NULL, the neighboring vertices of a vertex are vertices that are directly connected to the vertex, wherein each successive iteration of the relabeling uses labels of each of the plurality of vertices after a previous iteration of the relabeling; and programming instructions for recursively performing circuit tracing operation starting from the selected vertex until each of the plurality of vertices in the smaller circuit is matched with one of the plurality of vertices in the larger circuit, the circuit tracing operation includes matching a label of each of the plurality of vertices neighboring the selected vertex in the smaller circuit with a label of each of the plurality of vertices in the larger circuit neighboring a vertex corresponding to the selected vertex, wherein labels at a same depth of relabeling iteration being matched, and wherein an identification of the smaller circuit in the larger circuit is performed by comparing a label of a selected vertex of the smaller circuit with a plurality of labels in the larger circuit, wherein the comparing of the label is performed after a same number of relabeling iterations has been performed on both the smaller circuit and the larger circuit.

15. The non-transitory computer readable medium as recited in claim 14, wherein the programming instructions for recursively relabeling includes programming instructions for assigning one initial unique label to each of the plurality of vertices, each of a plurality of connection-types, power connection, and ground connection in the smaller circuit and the larger circuit, a NULL label being assigned to each of an input/output ports and a same initial unique label is assigned to same types of circuit components.

16. The non-transitory computer readable medium as recited in claim 14, wherein the programming instructions for recursively relabeling includes programming instructions for storing new labels at each relabeling iteration depth of each of the plurality of vertices both in the smaller circuit and the larger circuit in a data store.

* * * * *